Dec. 21, 1965   C. D. FISHER   3,224,814
CONDUIT FOR PNEUMATIC CONVEYING SYSTEMS
Filed Dec. 3, 1962
FIG. 1
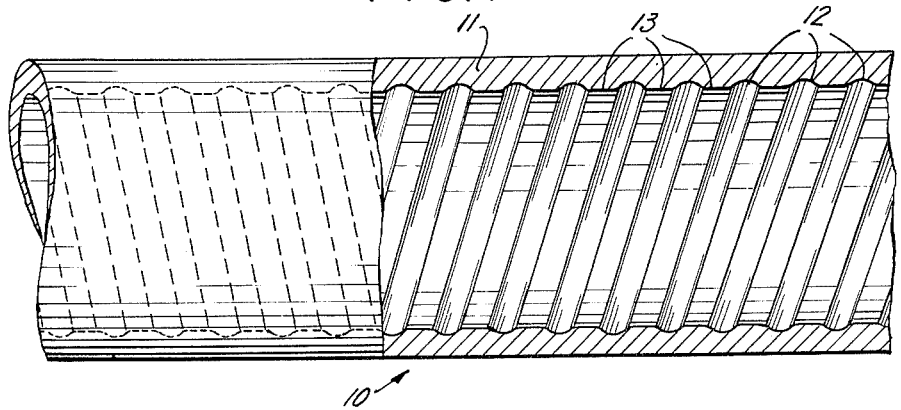
FIG. 2
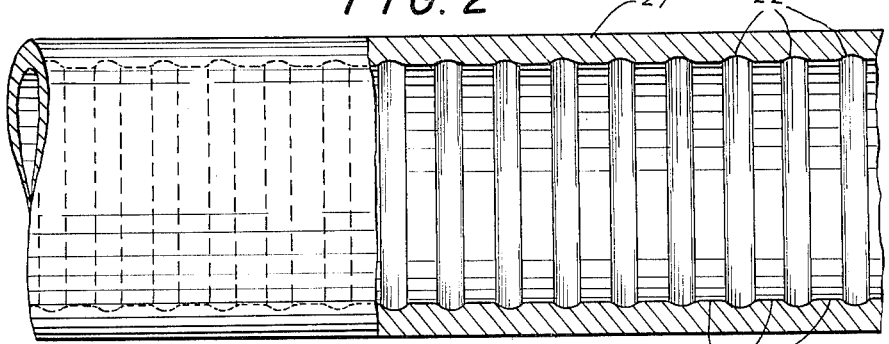
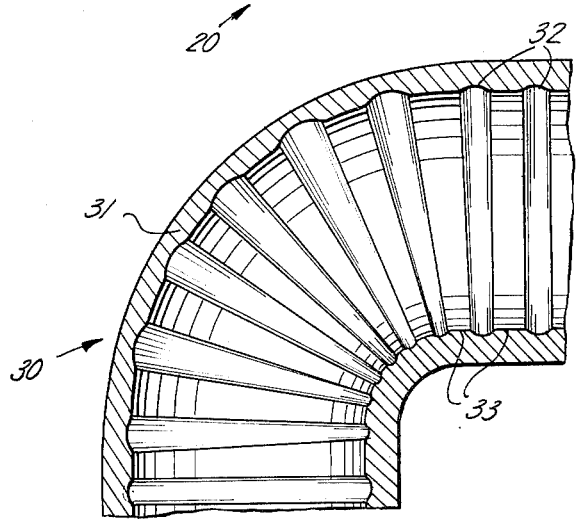
FIG. 3
INVENTOR.
CHESTER DONALD FISHER
BY
ATTORNEY

United States Patent Office 3,224,814
Patented Dec. 21, 1965

3,224,814
CONDUIT FOR PNEUMATIC CONVEYING SYSTEMS
Chester Donald Fisher, Muncy, Pa., assignor to Sprout, Waldron & Company, Inc., Muncy, Pa., a corporation of Pennsylvania
Filed Dec. 3, 1962, Ser. No. 241,691
5 Claims. (Cl. 302—64)

This invention relates to material-conveying conduits for pneumatic conveying systems in which solid particles or pellets of material are conveyed as entrained in a stream of rapidly flowing air under pressure and, more particularly, to conduits for use in such systems conveying pellets or particles of plastic or other relatively soft material susceptible to abrading on the inner walls of the conduit, and to such conduits having smoothly contoured corrugations uniformly over the inner walls thereof for interrupting continuous contact between such conveyed materials and the inner walls of the conduits.

In many instances and situations, it may be desired to provide pneumatic conveying systems for handling in bulk a variety of materials in particulate or pelleted form as by entraining the particles or pellets in a rapidly moving stream of air for automatic conveying through conduits. Quite aside from purely aerodynamic flow considerations of such a particle-entraining airstream, at least some of the particles being pneumatically conveyed come into abrading or rubbing contact with the inner walls of the conveying conduit, not only at elbows and bends therein, but also even in straight sections. The effect, if any, of such contact by the entrained particles with the inner walls of the conduit (other than flow resistance or boundary layer effects or similar considerations) depends significantly upon the composition and characteristics of the partcles beng conveyed.

As will be understood, with certain particulate or pelleted materials (notably pellets of relatively soft synthetic plastic or resin materials such as polyethylene), a portion of the surface layer of at least those pellets contacting the conduit walls is removed by abrasion as the pellets are entrained and flow through the conduit. Especially with plastic or resin materials such as polyethylene, material abraded off the pellets by rubbing contact with the conveying conduit walls may cohere or agglomerate to form fairly large or continuous pieces of films or "skins" which are also gradually conveyed through the system and emerge from the outlets thereof in rather substantial quantities and as large areas of continuous film, sometimes enclosing the pellets, and in a manner which is undesired or interjects difficulties in the ultimate use or handling of the pellets at the point to which they are being conveyed.

It is believed that such "skinning" and, more particularly, the undesired coalescense of material abraded from the entrained particles into a continuous sheet or film, is produced primarily if not entirely by the above noted inevitable rubbing or abrading contact between the particles and the inner walls of the conveying conduit. It has been noted that such "skinning" results in the undesired accumulation of films as a function of the extent of probably contact between the particles being conveyed and the inner walls of the conduit. In any event, regardless of the reason or manner in which such "skinning" films are formed in the pneumatic conveying of plastic pellets, the production is undesirable and interjects difficulties into the satisfactory handling of the pellets and the satisfactory operation of such pneumatic conveying systems. Furthermore, if it is attempted to minimize the formation of such skinning films, such expedients tend so to diminish the efficiency or practicality of the entire pneumatic conveying system as no longer to provide an economical or expeditious arrangement.

According to this invention, however, there are provided conduit structures for such pneumatic conveying systems to eliminate or minimize such "skinning" effects or undesired film formations from resin pellets or other materals being conveyed or entrained therethrough, and having internally contoured inner walls providing a uniform and relatively smooth yet discontinuous surface, as illustrated by shallow rounded helical or transverse annular grooves or corrugations provided substantially throughout the inner conduit walls for avoiding coalescence of material rubbed or abraded from the entrained pellets by discontinuous or spaced ridges between the grooves; while also having the radial depths and axial widths and configurations of the contoured or grooved surfaces correlated with the size of the particles or pellets flowing therethrough and with the throughput capacity and rate of the conveying system so that the material being conveyed is not entrapped or engaged within the grooves and so that the contoured surface presents substantially no undesired aerodynamic or other resistance or restriction on the flow of entrained material or conveying air through the conduit.

With the foregoing and additional objects in view, this invention will now be explained in more detail, and other objects and advantages thereof will be apparent from the following description, the accompanying drawings, and the appended claims.

In the drawings:

FIGS. 1 and 2 illustrate, somewhat diagrammatically, portions of conduits embodying and for practicing this invention, partly broken away, and indicating internal configurations in accordance herewith; and FIG. 3 illustrates, somewhat diagrammatically, a bend or elbow portion of a conduit embodying and for practicing this invention and having the helical internal configuration of FIG. 1 applied thereto.

Referring to the drawing, in which like reference characters refer to like parts throughout the several views thereof, there is illustrated or diagrammed in FIG. 1 a type of embodiment of conduit in accordance herewith and including internally contoured, smoothly finished, helical grooves or corrugations for providing the smooth but discontinuous rubbing or "non-skinning" internal conduit surfaces of the character described and embodying and for practicing this invention. Thus, there is shown a partial section or portion of a generally cylindrical tubular conduit 10 for use in a pneumatic conveying system of the characted described. Conduit 10 is shown as including an inner wall 11, around and along which have been formed a generally helical series of rounded grooves 12 interspersed with generally smooth and radially inwardly extending ridges 13.

Merely illustrative of dimension or configurations with which satisfactory results have been achieved in accordance herewith, such internally contoured grooves or corrugations in helical configurations are arranged to advance linearly or axially along conduit 10 about one to four pitches (with the pitch being defined as the axial distance between the center lines of adjacent grooves 12). In conduits having diameters varying within the range of from about 2″ to about 10″, satisfactory results are obtained with the pitch or distance between adjacent grooves failing within the range of about ⅛″ to 1″, and with the radii of the circumferential sections of the grooves being about ⅙ to ⅝ of the pitch, to give a depth of groove approximately ¹⁄₆₄″ to ¹⁄₃₂″ depending somewhat upon the thickness of the conduit wall 11.

Although the helical progression of grooves 12 and ridges 13 along the inner walls 11 of conduit 10 forms a preferred arrangement in accordance herewith, an annular or non-helical transverse configuration such as in FIG. 2 is also to be comprehended as within this invention. There, for example, is shown a conduit 20 having inner walls 21 around which are provided a plurality of annular transverse grooves or corrugations 22, between which are ridges 23 uniformly spaced and smoothly arranged through and along conduit 20.

In connection with the foregoing, and also merely as illustrative, it is to be noted that pneumatic conveying systems of the character to which this invention relates may generally be considered as utilizing conveying air streams at pressures generally of the order of about 10 p.s.i.g. maximum and air velocity generally within the range of about 3000 to 6000 ft./min., and to produce conveyed material-to-air ratios of generally about 3 to 25 lbs. material per lb. of air. Although such factors are not to be considered limiting hereof, they are noted as indicating generally the flow conditions obtaining within such conduits as described above. Thus, the various grooves or corrugations 12 or 22 in accordance herewith (whether helical or annular) and the various ridges 13 or 23 therebetween are generally sufficiently shallow (and preferably sufficiently rounded) as to produce little or no additional flow resistance or velocity reduction or turbulence in the air stream as compared with, for example, perfectly smooth inner conduit walls.

Similarly, the grooves 12 or 22, etc. are also quite shallow with respect to the size of the particles being conveyed (which may generally be considered as within the range of about $\frac{1}{16}$–$\frac{1}{2}$″) so as to provide substantially no fractionally restrictive effect on the flow through the conduit or even those particles which are adjacent the inner conduit walls, at least as compared with smooth inner conduit walls. Although it is usually preferred to have the pitch of the grooves (and/or the axial extents thereof) also substantially less than the dimensions of the particles or pellets being conveyed, there is still substantially no additional flow restriction on the conveyed material even if the particles or pellets being conveyed may actually have one dimension somewhat less than the axial width of the grooves, provided the depth of the grooves is sufficiently slight to avoid velocity reduction effects as might occur if a particular particle were able to become entrapped in any of the grooves 12 or 22 or behind or against any of the ridges 13 or 23.

Thus, it is intended in accordance herewith to provide conduit structures having controlled uniform discontinuities uniformly arranged around and along the inner walls thereof but in a manner which avoids increasing either flow resistance for the conveying air stream or velocity reduction or resistance of the material being conveyed. Such discontinuities provide interruptions in the continued abrading rubbing contact of the particles with the inner conduit walls, as compared with a completely smooth conduit, so that the peripheral particles being conveyed through the conduit and located immediately adjacent in the inner walls thereof will not contact a continuous or smooth surface. In this manner, any material abraded off the particles as they may contact the various ridges 13 or 23 will result in discontinuous bits of "skin" or dust, rather than forming continuous pieces or films.

In such manner, then, not only is the total abrading area of the conduit substantially reduced by the discontinuities, but any material which may be abraded off the peripherally located particles or pellets remains as a generally discontinuous dust and without the above noted disadvantages attendant to the conventional continuous "skin" formation in pneumatic conveying systems. Indeed, the insulation in accordance herewith of the particles being conveyed from continuous rubbing or abrading contact with the inner conduit walls may substantially reduce the amount of material abraded from the particles in the first place, as compared with continuous rubbing contact with smooth conduit walls, and may also thus actually increase the efficiency of the conveying step as by reducing flow resistance or aiding in the maintenance of a greater portion of the conveyed material as the desired particles or pellets.

As will be understood, however, the foregoing advantages are primarily to be achieved in accordance herewith with internal wall configurations which, although desirably discontinuous, are sufficiently radially shallow and/or axially smooth or uniform so as to exercise substantially no additional inhibiting or flow resistance on the air stream or the materials being conveyed and, particularly, so as to avoid actual entrapment or physical baffling of either the conveying air or the material being conveyed as might be the case if the various grooves 12 or 22 were deeper or wider than the actual particles being conveyed. It is also to be noted, that the interior of the conduit walls is preferably smooth, rather than rough or abradent, notwithstanding the discontinuities provided. That is, the inner circumferential edges of the grooves 12 or 22 are preferably rounded, or at least not sharp, for further minimizing any tendency to restrict or reduce the flow of particles and/or increase the abrading removal of skin as might otherwise be the case with sharp edges or other roughened or abrasive conduit surfaces.

Although conduit structures embodying and for practicing this invention are satisfactorily manufactured by a variety of techniques, as will be well understood by men in this art, satisfactory results in accordance herewith have been achieved by utilizing smooth or conventional aluminum or similar conduit materials, and impressing the internal corrugations or grooves 12 or 22 around and along the inner walls of the conduit as by cutting or spinning on a lathe. As will be understood, satisfactory configurations are readily produced by other methods and from other materials.

Similarly, in instances where it is also desired to incorporate the internal configurations in accordance herewith in a section of pneumatic conveying conduit which may not be straight—i.e., as in a bend or elbow—such structures are also made in accordance herewith. For example, there is shown in FIG. 3 an illustrative right-angle elbow indicated as 30 and having an inner wall 31 in which are provided annular grooves 32 having ridges 33 between. In the illustrated embodiment, this bend or elbow section was formed by first grooving a straight section of conduit (as in FIG. 2), and thereafter bending the internally contoured conduit to form a right angle bend (in known manner), with the resulting configuration indicated in FIG. 3 whereby the various grooves 32 and ridges 33 are arranged around the conduit bend. It is to be noted, nevertheless, that neither the depth nor the spacing or widths of the various grooves 32 or ridges 33, even in the curved section 30, is sufficiently great as to entrap or inhibit desirable flow of either the conveying air stream or the mass of material being conveyed thereby.

As will be apparent from the foregoing, there is thus provided in accordance herewith internally contoured pneumatic conveying conduit structures for conveying systems of the character described, and in which the internal conduit walls are provided with controlled and uniform shallow discontinuities to interrupt continuous rubbing or abrading contact of conveyed material with the internal conduit walls without, nevertheless, introducing an additional factor of flow resistance. In this manner, the efficiency of the conveying system is maintained (or even enhanced) while there is avoided the continuous rubbing or "skinning" production of large pieces or strips of film formed from material scraping along the conduit walls. Although the internal corrugations or discontinuities are sufficiently shallow or small so as to interject no additional flow resistance, they do insulate the conveyed pellets from continuous rubbing contact with the conduit walls so that, as noted, any inevitable abraded material from the pellets is formed merely as discontinuous dust or tiny particles, rather than as a cohesive film.

While the particular forms of apparatus herein described constitute preferred embodiments of this invention, this invention is not limited to these precise forms of apparatus, and changes may be made herein without departing from the scope of this invention which is defined in the appended claims.

What is claimed is:

1. A pneumatic conveying conduit member of the character described for conveying therethrough plastic pellets entrained in a stream of air and susceptible to abrading contact with the inner wall surfce of said conduit, which comprises a generally tubular conduit having an inner wall surface for enclosing and conducting said particles as entrained in said air stream, internal grooves in said inner wall surface and substantially uniformly spaced therealong and extending radially below said well surface providing alternating grooves and ridges, the junctures of said grooves and ridges being rounded to avoid sharp edge portions, the radially inner surfaces of said ridges being substantially flat and in alignment forming said inner wall surface, and each of the axial spacing of said ridges and the axial extent and radial depth of said grooves all being substantially less then the size of said entrained plastic particles for avoiding entrapment of said particles in said grooves and continuous abrading contact of said particles with said inner wall surface.

2. A pneumatic conveying conduit member of the character described for conveying therethrough plastic pellets entrained in a stream of air and susceptible to abrading contact with the inner wall surface of said conduit, which comprises a generally tubular conduit having an inner wall surface for enclosing and conducting said particles as entrained in said air stream, internal grooves extending radially into said inner wall surface and substantially uniformly spaced therealong providing alternating circumferential grooves and ridges around said inner wall surface, the junctures of said grooves and ridges being smoothly rounded to avoid sharp abrading edge portions, said grooves being substantially wholly disposed radially beyond said inner wall surface leaving substantially no projections into said conduit radially inwardly of said inner wall surface as defined by the radially inner surface of said ridges, and each of the axial spacing of said ridges and grooves and the radial depth of said grooves being substantially less than the size of said entrained particles avoiding entrapment of said particles in said grooves and continuous abrading contact of said particles with said inner wall surface as said particles are conducted through said conduit entrained in said air stream.

3. A pneumatic conveying conduit member as recited in claim 2 in which said grooves and ridges progress helically along said inner wall surface.

4. A pneumatic conveying conduit member as recited in claim 2 in which said grooves and ridges are separately circumferentially disposed around said inner wall surface.

5. A pneumatic conveying conduit member as recited in claim 2 in which the axial spacing of said grooves and ridges being within the range of about 1/8 inch to one inch from the center of one ridge to the center of the next succeeding ridge for avoiding said entrapment of said particles in said grooves and between said ridges.

References Cited by the Examiner

UNITED STATES PATENTS

| | | | |
|---|---|---|---|
| 356,888 | 2/1887 | Pfeiffer | 138—154 |
| 1,263,340 | 4/1918 | Silk | 138—154 |
| 2,784,038 | 3/1957 | Schneider | 302—64 |
| 3,117,821 | 1/1964 | Mylting | 302—64 |

SAMUEL F. COLEMAN, *Primary Examiner.*

ANDRES H. NIELSEN, *Examiner.*